US008775296B2

(12) United States Patent
Assia

(10) Patent No.: US 8,775,296 B2
(45) Date of Patent: Jul. 8, 2014

(54) SOCIAL BASED AUTOMATIC TRADING OF CURRENCIES, COMMODITIES, SECURITIES AND OTHER FINANCIAL INSTRUMENTS

(75) Inventor: Johnathan Assia, Savion (IL)

(73) Assignee: Etoro Group Limited, Tortola (VG)

( * ) Notice: Subject to any disclaimer, the term of this patent is extended or adjusted under 35 U.S.C. 154(b) by 0 days.

(21) Appl. No.: 13/225,915

(22) Filed: Sep. 6, 2011

(65) Prior Publication Data
US 2013/0060672 A1    Mar. 7, 2013

(51) Int. Cl.
*G06Q 40/04*    (2012.01)
(52) U.S. Cl.
USPC ................................................ 705/37; 705/38
(58) Field of Classification Search
USPC ...................................................... 705/35–40
See application file for complete search history.

(56) References Cited

U.S. PATENT DOCUMENTS

| 7,249,080 | B1 | 7/2007 | Hoffman |
| 7,373,324 | B1 | 5/2008 | Engin et al. |
| 7,401,039 | B1 | 7/2008 | Lin et al. |
| 7,747,502 | B2 | 6/2010 | Arnott et al. |
| 2008/0195524 | A1 | 8/2008 | Quinlivan |
| 2010/0005035 | A1 | 1/2010 | Carpenter et al. |
| 2010/0023459 | A1* | 1/2010 | Sundby ....................... 705/36 R |

* cited by examiner

*Primary Examiner* — Thu Thao Havan
(74) *Attorney, Agent, or Firm* — Katten Muchin Rosenman LLP

(57) ABSTRACT

The present invention includes methods, apparatuses, systems, platforms and associated software applications for facilitating semi-automatic or automatic trading of Financial Assets based on the past or present trading activities of other traders (e.g. "Social Trading", optionally implemented as a "Linked Account Trading System").

30 Claims, 6 Drawing Sheets

SOCIAL BASED AUTOMATIC TRADING OF CURRENCIES, COMMODITIES, SECURITIES AND OTHER FINANCIAL INSTRUMENTS

FIELD OF THE INVENTION

The present invention generally relates to the field of automated trading systems. More specifically, the present invention relates to methods, systems, platforms and associated software applications for facilitating social based algorithmic trade of currencies, stocks, commodities, securities and other financial instruments.

BACKGROUND

Traders (Forex, stocks, commodities etc') may now rely on automatic tools ("algo-trading"). In electronic financial markets, algorithmic trading or automated trading, also known as "algo-trading", "black-box trading" or "robo-trading", is the use of computer programs for generating and executing trading orders, with the computer algorithm deciding on aspects of the order such as the timing, price, or quantity of the order, or in many cases initiating the order without human intervention. The investment decision and implementation may be augmented at any stage with algorithmic support or may operate completely automatically ("on auto-pilot").

A considerable amount of financial trading is now performed via the Internet, using one of many trading websites to facilitate trading. It has been suggested to data-mine the trading transactions performed via such websites, in order to detect market trends and to allow a novice trader to follow such trends.

Similarly, software has been developed that rates the trading success of individual traders, and upon detection of a "master trader" ranked with a high financial success rate, the software allows other traders to automatically copy future trades performed by such "master traders". While some websites maintain the anonymity of the master trader, others allow such master traders to expose their identity and, for instance, chat with other traders online.

The inventors have developed one such social trading website which allows users to follow trades performed by other users, and allows users to view ranking of "master traders". This website has the URL: http://openbook.etoro.com.

Once a user has requested to automatically copy a "master trader", the software will blindly follow any trading actions taken by the master trader.

The disadvantage of such automatic copying of a "master trader" lies in human fallacy, namely, even though a specific master trader has been ranked as being successful over a given amount of time, this does not ensure that he will notice sudden or subtle changes in market trends. A master trader may, for instance, be out for a weeklong illness during which he performs no trades, and his automatic "blind followers" may lose significant sums if the market takes a sudden turn.

The need exists for trading software that allows detection of "master traders", allowing others to follow their trading transactions only in such cases where these trades are predicted to be profitable. The need exists for software that analyzes trades performed by master traders, and algorithmically checks whether the market conditions support this trade. In such cases where the algorithms suggest otherwise, the software will override the "automatic" following of the master-trader and will instruct the novice trader to disregard the master-trader's transaction. Additionally, the need exists for software that utilizes data mining to detect market trends unnoticed by a predefined master trader, and that informs a trader that trades should be performed that the master trader has overlooked.

SUMMARY OF THE INVENTION

With the recent increase in electronic markets openness, and the expanded growth in the number of internet based financial services in the last decade, a new kind of algorithmic trading strategies is now enabled—which may be referred to as "social trading".

Social Trading—based on the fact that there are nowadays enormous amounts of user generated financial and trading information available online, and the assumption that at least some of this information contains valuable insights or some other understanding or knowledge regarding the markets, a new type of automatic or algorithmic trading mechanism is possible, that would be based on this information. Such a trading method may be called a Social Trading method, as it is based on the information gathered in social environments, in social contexts, or by social interactions (social in this context including the relation between traders whose only commonality is trading in the same environment). This information may include the actual trading activities performed by other traders. A formal way of describing, analyzing and acting upon this information may be provided—which may be denoted as Computational Social Finance, or Computational Social Trading.

Computational Social Science, Finance and Trading— with the spread of pervasive computing systems, an increasing fraction of human interactions nowadays are being digitally captured. These digital breadcrumbs, combined with substantial computational power, create enormous opportunities for ground breaking science. Investigating these newly available pieces of information, seeking internal correlations as well as correlations with global behaviors can lead to an improved understanding of collective human behavior.

The study of the correlation between social interactions and the ability of communities to complete complicated tasks is therefore of extremely high relevance in today's connected world, and of specific applicability for financial trading, due to the enablement of (Computational) Social Trading. To date, there has been no analytical quantitative research of the "efficient" way to manage social based interactions for the purpose of (either self-centric or collaborative) financial trading.

The present invention provides novel methods for the representation and execution of automatic trading strategies— social finance based trading.

That is, the invention provides trading rules and strategies that indicate when to trade completely based on the activities or behavior patterns of other members ("master traders") of a predefined trading community. The software of the invention indicates to a user when it is best NOT to trade based on the activities of another trader (based on trading algorithms and strategies). This approach is based on the assumption while many members of a trading community can gain superior revenues from following the activities of other community members rather than self experimenting with traditional analysis techniques, however, it is always wise to algorithmically check the "master trader's" transactions and to check the market conditions before executing a trade.

The algorithms provided by the invention, grant superiority by mathematically determining whether the "master trader's" transactions are prudent, and the algorithms additionally utilize data-mining to detect market trends overlooked by the "master trader".

Throughout this description the term "Linked Accounts" may be used to represent an either implicit or explicit interaction involving a relation in which the trading activities of one of the accounts may be influenced at some times and possibly under some constraints by the trading activities of another account or accounts.

Similarly, Linked-Account Trading Systems ("LATS") denote mechanisms that implement a social trading mechanism. Namely, enable some traders to have some of their trading activities automatically determined, or influenced in some pre-defined way by the trading activities of other members (one or more, of a fixed or dynamic identity) of the trading community.

The present invention includes methods, systems, platforms and associated software applications for facilitating automatic or semi-automatic trading of currencies, commodities and financial instruments, using information relating to the trading activities of other traders (optionally in combination with other analysis techniques).

The System of the Invention (Overview)

According to some embodiments of the present invention, there is provided a Linked-Account Trading System ("LATS") which may include: (1) a Linked-Account Trading Platform (e.g. trading software running on one or more functionally associated servers), and (2) client side Trading System Interface Applications (e.g. software application running on a computing platform or within a web-browser of a computing platform) communicatively coupled to the Linked-Account Trading Platform.

According to some embodiments, some or all of the trading accounts on the LATS may have one or more Automated Trading Rules or Automated Trading Instructions ("A-Trading" Rules) associated therewith. The LATS may include, or be functionally associated with, an Automated Trade Order Generator adapted to generate trading orders for a given trading account based on one or more automated trading rules associated with the given trading account. According to even further embodiments, the LATS may include an Account Linkage Automatic Trading Rule Updater (UPDATER) which is adapted to update the A-Trading rules associated with a given trading account based on: (1) the given account's defined linkage with one or more reference accounts, (2) activity on the reference account, and/or (3) defined market activities or events.

According to some embodiments, a trading system may include or be functionally associated with a database storing information relating to one or more trading accounts. Information stored for a given account may include: (1) the account's position; (2) one or more A-Trading Rules; and (3) one or more parameters defining the given account's Linkage to other accounts, including one or more Reference Accounts.

Linkage between a given account and a Reference Account may be defined as one or more relationships between trading related activity occurring on the Reference Account and one or more A-Trading Rules on the given account.

Account linkage parameters may include values or other digital forms of identifiers for: (1) identification of Reference Account(s) to link the given account with; (2) correlating specific trading related activities on the linked reference account with specific A-Trading Rules on the given trading account; (3) to what extent, and/or in which way, to change an A-Trading Rule of the given trading account based on correlated trading related activities on the Reference Account; and (4) any other trading related (optionally: complex) conditions and/or market related (optionally: complex) condition(s) to factor when changing an A-Trading Rule of the trading account.

Accordingly, a Linked Account Automated Trading Rule Updater (UPDATER) may be adapted to update one or more automatic trading rules (i.e. a first set of A-Trading Rules) of the given trading account in response to trading related activity within a first Reference Account to which the given account is linked. The UPDATER may be further adapted to update other automatic trading rules (i.e. a second set of A-Trading Rules, which second set may or may not overlap with the first set) of the given trading account in response to trading related activity within a second reference account to which the given account is linked. Likewise, an UPDATER may be adapted to update automatic trading rules of each of two or more trading accounts based on trading related activity within one or more reference accounts to which each of the two or more trading accounts is linked.

The present invention allows an UPDATER to periodically define A-trading rules that may optionally be tailored to a specific user or preferred trading style. The A-trading rules define when to automatically trade based on automatic account linkage to one or more detected and ranked master-traders. The A-trading rules will define when to follow other market trends not noted by the master-traders, and when to ignore market fluctuations. Non-limiting examples of A-trading rules are described herein-below as well as in the Examples section. According to some embodiments, there may be provided an account management application which allows a user to update account linkage parameters associated with a trading account. Account linkage parameters which may be updated may include: (1) identification of Reference Account(s) to link with; (2) correlate specific trading related activities on the linked account with specific A-Trading Rules on the trading account; (3) to what extent, and/or in which why, to change an A-Trading Rule of the trading account based on correlated trading related activities of the Reference Account; and (4) any other trading related and/or market activity related condition(s) to factor when changing an A-Trading Rule.

According to some embodiments, there may be provided a system or an environment or a mechanism for representing A-Trading rules in a variety of ways. Specifically, there may be provided a system or an environment or a mechanism for visually representing A-Trading Rules using a set of objects and operators that indicate the interactions between them, according to some pre-defined representation language. Accordingly, users of the systems, environments or mechanisms that implement the present invention may be provided means to view, update, generate, activate, modify or interact in any other way with A-Trading Rules that are associated with their accounts.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein. Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, magnetic and/or optic, quantities within the computing system's registers and/or memories into other data similarly represented as physical quantities within the computing system's memories, registers or other such information storage, transmission or display devices.

The present invention includes methods, computer systems, platforms and associated software applications for facilitating automatic or semi-automatic trading of currencies, commodities, securities and financial instruments (hereinafter referred to collectively as: "Financial Assets").

The present invention facilitates trading of Financial Assets based on the past or present trading activities of other traders (e.g. "Social Trading", optionally implemented as a "Linked Account Trading System").

In general, the present invention discloses a system and software application that follows "social trading" performed at one or more websites, and utilizes data-mining to rank traders and identify "master-traders". The software allows other users to then link their accounts to such master traders, so that future trades will copy those of the master trader's, either in an automatic or semi-automatic manner.

The software includes novel Automated Trading Rules (A-Trading Rules) that check each trade performed by a master-trader and output a decision to a user whether it is suggested to follow the master trader or not. Additional A-trading rules may dictate performing specific trades that were overlooked by the master-trader. These suggested trades are based on algorithmic detection of market trends, using data mining of "social trading" performed at one or more trading websites.

Such A-trading rules have not been utilized in past, and achieve maximum profit for a relatively novice trader, who may now rely on automatic statistical analysis of suggested trades, and on automatic detection of market flux.

Figure 1:
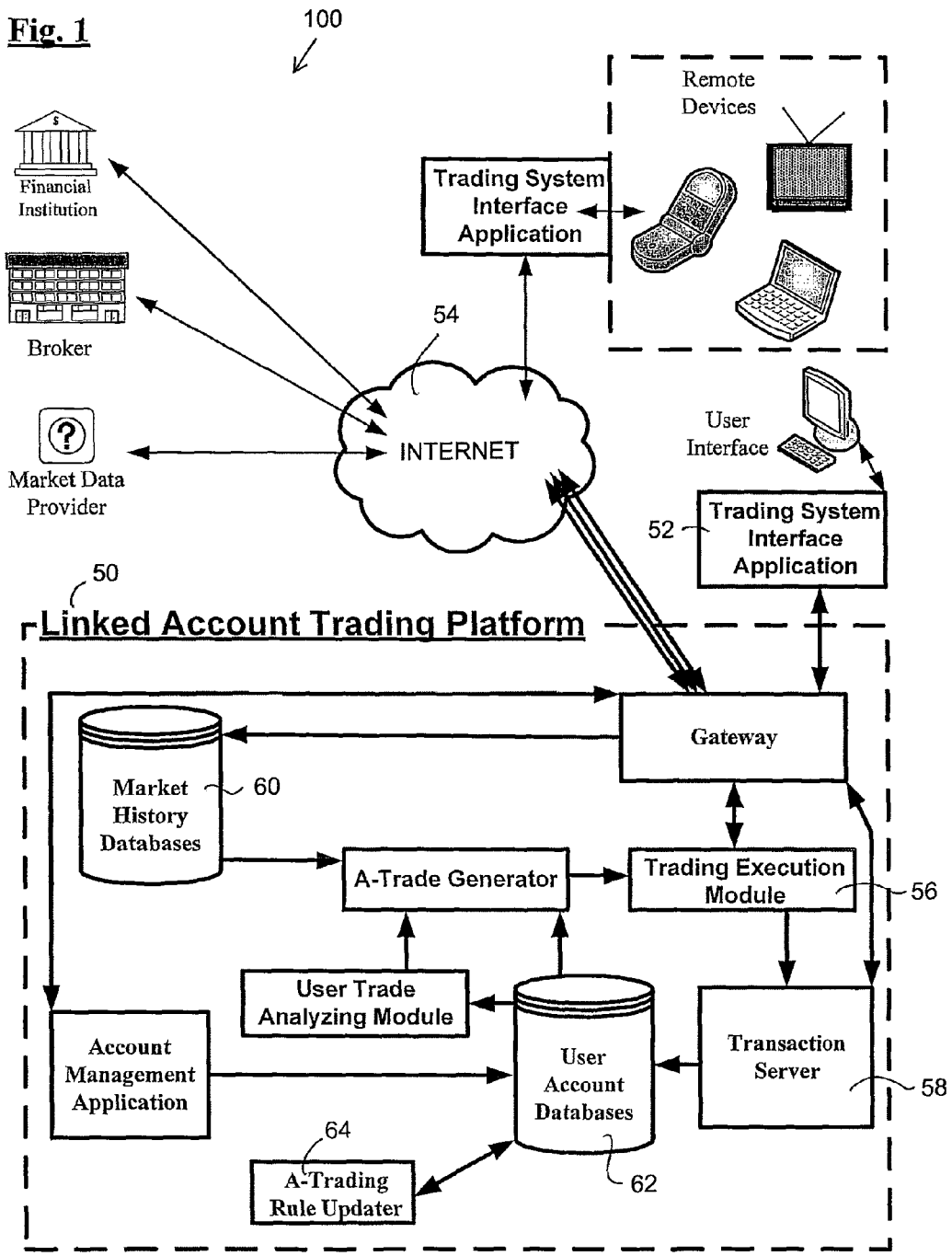
FIG. 1 is a functional block diagram showing an overview of the functional relationships between components of an exemplary Linked Account Trading System, in accordance with the present invention.

Referring to FIG. 1, an overview is shown of the functional relationships existing between components of the system of the invention. The invention provides a Linked-Account Trading System ("LATS") 100 which may comprise: (1) a Linked-Account Trading Platform 50 (e.g. trading software running on one or more functionally associated servers), and (2) one or more client side Trading System Interface Applications 52 (e.g. software application running on a computing platform or within a web-browser of a computing platform) communicatively coupled to the Linked-Account Trading Platform 50, possibly via a distributed data network, such as the internet 54.

The LATS may further comprise or be functionally associated with a Trade Execution Module 56 adapted to execute trades of Financial Assets on one or more markets and/or exchanges where these are traded. The Trading Module may be adapted to execute trades by: (1) directly executing trades on markets/exchanges, possibly via appropriate Application Programming Interfaces; (2) ordering desired trades from an exterior trade service provider (Broker); and/or (3) any other Financial Asset trading method known today or to be devised in the future. The LATS may further comprise a Transaction Server 58, which Transaction Server 58 may be adapted to facilitate monetary transactions between a user and the system, i.e. deposit and withdrawal of funds to/from a trading account, and may be further adapted to update account balances and positions, based on the user's activity on the system and results of trades performed by the user on the system.

The LATS may further comprise or be functionally associated with one or more Market History Databases 60 containing data relating to the trade of Financial Assets on one or more markets and/or exchanges where these are traded. The data contained within the Market History Databases may be retrieved and updated from one or more markets/exchanges, directly or via a third party (a "Market Data Provider").

The LATS may further comprise one or more User Account Databases, 62 containing Trading Accounts of users of the LATS. A given Trading Account of a given user of the LATS may include: (1) a current cash/monetary balance available to the given user on the given account; (2) a transaction history for the given account; (3) the given account's open positions (i.e. Financial Assets currently owned and/or owed by the user as a result of trade activity on the given account); (4) a trade history comprising parameters and outcomes of trades previously performed by the given user; (5) Automated Trade Rules ("A-Trade Rules") associated with the given account (further described below); (6) Reference Account Linkage data associated with the given account (further described below); (7) A-Trade Rule Updating Rules in a A-trading rule updater 64, associated with the given account (further described below); and/or (8) any other data relating to a given user trading account.

According to some embodiments, some or all of the trading accounts on the LATS may have one or more Automated Trading Rules or Automated Trading Instructions (A-Trading Rules) associated therewith. A-Trading Rules may comprise definitions of trades to be automatically executed by the LATS when a pre-defined set of conditions are met—a pre-defined set of circumstances occurs, i.e. a pre-defined set of criteria, which when fulfilled, will automatically trigger the execution of pre-defined trades. In other words, A-Trading Rules may comprise one or more algorithms designed to produce parameters of automatic trades to be executed based on a series of variables (the criteria/circumstances). In a simple example, an A-Trade Rule may comprise: "If the price of oil drops one or more percent over one day more than once within a one week period, sell 50% of oil related financial assets owned."

According to some embodiments of the present invention, conditions/criteria/circumstances/variables upon the occurrence of which A-Trade Rules may define automatic trades to be executed may include:

a. Market events—i.e. current parameters relating to the trade of one or more financial assets on one or more given markets/exchanges. For example: "If the price of oil goes below $50";

b. Market History—i.e. parameters relating to the history of the trade of one or more financial assets on one or more given markets/exchanges. For example: "If the price of oil goes above its 52 wk average";

c. Open Positions—i.e. parameters relating to the given user's open positions. For example: "If X then sell all oil related open positions";

d. Account Balance—i.e. the current monetary balance available in the given account. For example: "If X then purchase oil for 50% of current cash balance";

e. Other LATS user trades (specific user or users, users that meet a certain criteria, and/or general user trends or actions)—i.e. the trade activity of other users of the system (described in detail below);

f. Any other relevant criteria/circumstance/variable; and/or g. Any combination thereof.

Accordingly, according to some embodiments of the present invention, a LATS trading account may be associated with A-Trading rules designed to automatically order certain trades of certain financial assets when certain market conditions arise in relation to these financial assets (by containing conditions associated with market events and/or history). An A-Trading rule may further qualify or modify the resulting A-Trade based on the current financial condition of the account (remaining balance, open positions, etc.).

Social Trading

According to further embodiments of the present invention, an A-Trade rule associated with a user trading account on a LATS may include conditions relating to the trading activity of other users of a LATS. These conditions may be related to one or more specific traders, one or more specific groups of traders and/or the general behavior of traders on the system.

Accordingly, A-Trade rules containing conditions relating to the trading activity of other users of a LATS may include:

a. rules designed to condition trades on the trading activity of certain traders selected by a user. For example, an A-Trade rule may comprise: "If Trader X purchases an oil related financial asset, purchase the same financial asset for 20% of the remaining balance on the account." Or, "If 2 of the 3 traders X, Y and Z purchase an oil related financial asset on the same day, purchase the same financial asset for 20% of the remaining balance on the account";

b. rules designed to condition trades on the trading activity of certain types of traders, or traders meeting certain criteria, which define them as "master traders". For example, an A-Trade rule may comprise: "If a Trader which averages more than 10% profit per annum on oil related trades purchases an oil related financial asset, purchase the same financial asset for 20% of the remaining balance on the account." Or, "If 30% or more of traders which average more than 10% profit per annum on oil related trades, purchase an oil related financial asset, purchase the same financial asset for 20% of the remaining balance on the account."

c. rules designed to condition trades on the trading activity of the general public of traders on a LATS. For example, an A-Trade rule may comprise: "If more than 20% of Traders on the system purchase an oil related financial asset, purchase the same financial asset for 20% of the remaining balance on the account." Or, "If 30% or more of traders on the system, purchase an oil related financial asset on the same day and no more than 10% of the traders on the system sell the same financial asset on the same day, purchase the same financial asset for 20% of the remaining balance on the account";

d. rules designed to condition trades based on a criteria relating to the trades themselves, without reference to the traders executing the trade. For example: "If trading volume of sale of a specific financial asset on the system rises more than 300% within an hour, sell any holdings of the specific financial asset currently within the trading account";

e. rules designed to allocate a portion of the trader's funds in a way which copies or duplicates the trading activities of another trader, or a group of traders, optionally using a different leverage;

f. rules designed to allocate a portion of the trader's funds in a way which copies or duplicates the trading activities of another trader, or a group of traders, optionally using a different leverage; automatically for a pre-defined period of time, or until being deactivated; and/or g. any other A-Trade rule including as a condition to its operation a reference to trading activity on a LATS.

Referring to FIG. 2, examples of simple A-trading rules are shown.

Figure 2A:
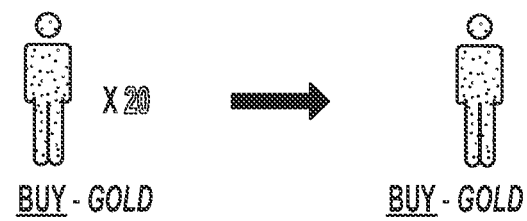
FIG. 2A is an exemplary visual representation of the Automated Trade Rule (A-Trading rule): "Automatically buy gold when 20 different traders are buying gold"

In FIG. 2A, a simplified A-trading rule is depicted, in which, "Automatically buy gold when 20 different traders are buying gold".

Figure 2B:
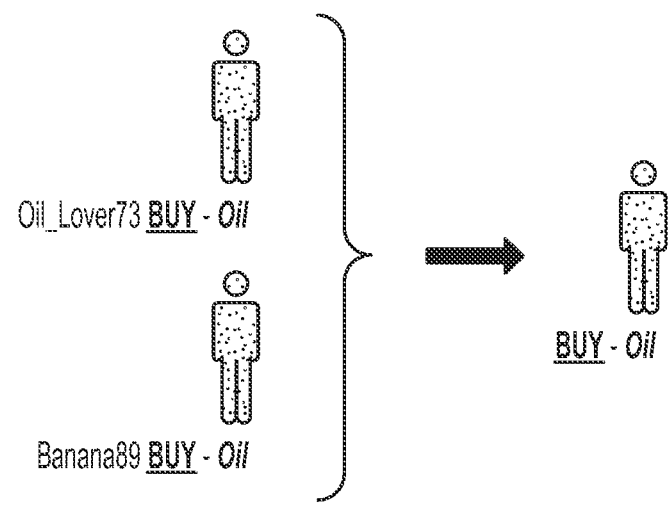
FIG. 2B is an exemplary visual representation of the Automated Trade Rule: "Automatically buy Oil when 2 specific pre-defined traders are buying Oil"

Referring to FIG. 2B, two specific traders were identified as "master traders", namely a trader having the username "Oil_Lover73" and another trader having the username "Banana98". The A-trading rule executed is "if both these master traders are purchasing a single commodity then buy this commodity as well". In this instance, both traders have purchased oil, therefore the software of the invention will automatically buy oil for the linked account, at a predefined quantity.

The weight given to any specific master trader's activities may be pre-set by the individual or by the system. Thus, for instance, a linked user's account may have defined A-trading rules, which determine that 20% of trading activities should mimic those of Account A (master trader A), while 80% of activities should mimic those of Account B (master trader B).

Figure 2C:
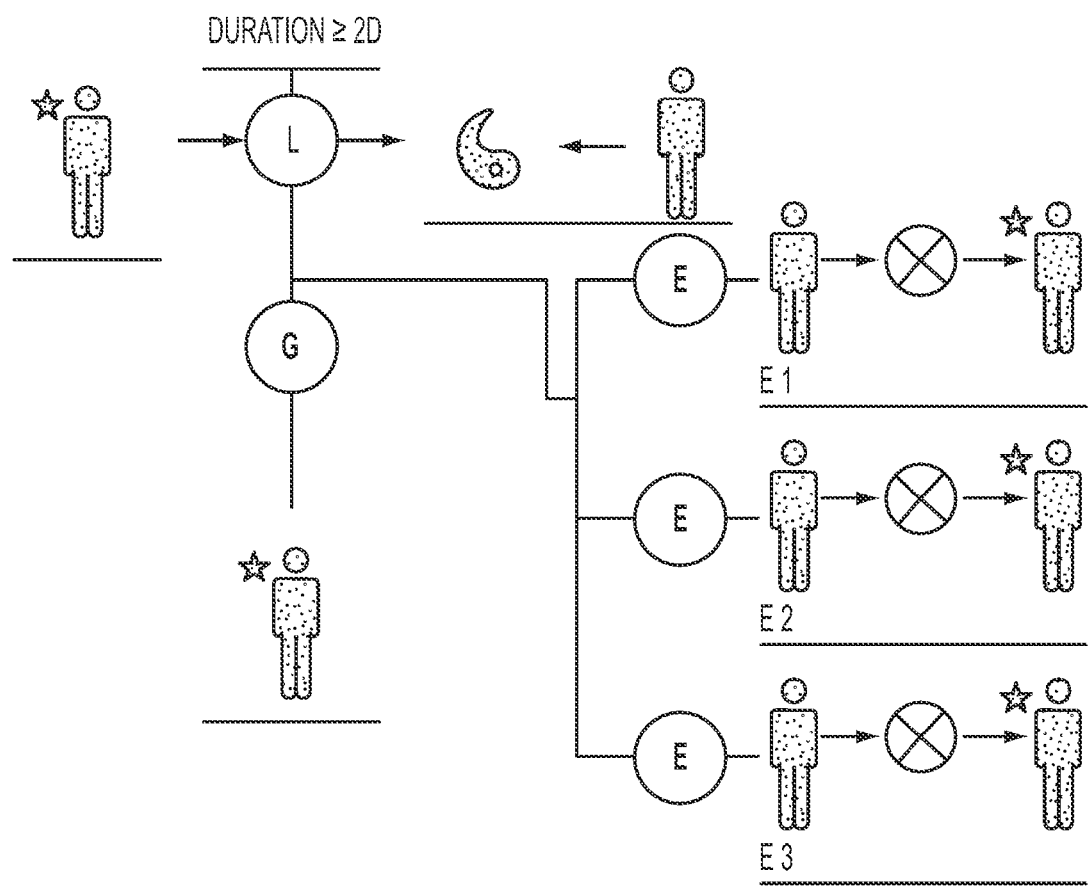
FIG. 2C is an exemplary visual representation of another Automated Trade Rule.

Referring to FIG. 2C, a visual representation is shown of the logic used by the software of the invention, to automatically identify Master traders. This logic is included in a module for ranking traders and identifying master traders: "Automatically copy all the activities of a trader that:

has had over some pre-defined number of positive closed positions (P1, P2, P3 . . . ) at a given time T;

after at least 20 days from T had closed a profitable position of high leverage that was open against the market trend at the time of opening;

throughout this period the trader has always maintained a positive trading score; and there exist at least 3 different traders that opened positions that were opposite to the above positions of this trader (P1, P2, P3 . . . ), and have closed them with a loss."

Wherein, in the exemplary visual representation presented in FIG. 2C, "G" denotes the "Globally" temporal logic operator and "E" denotes the "Exists" temporal logic operator.

Figure 3:
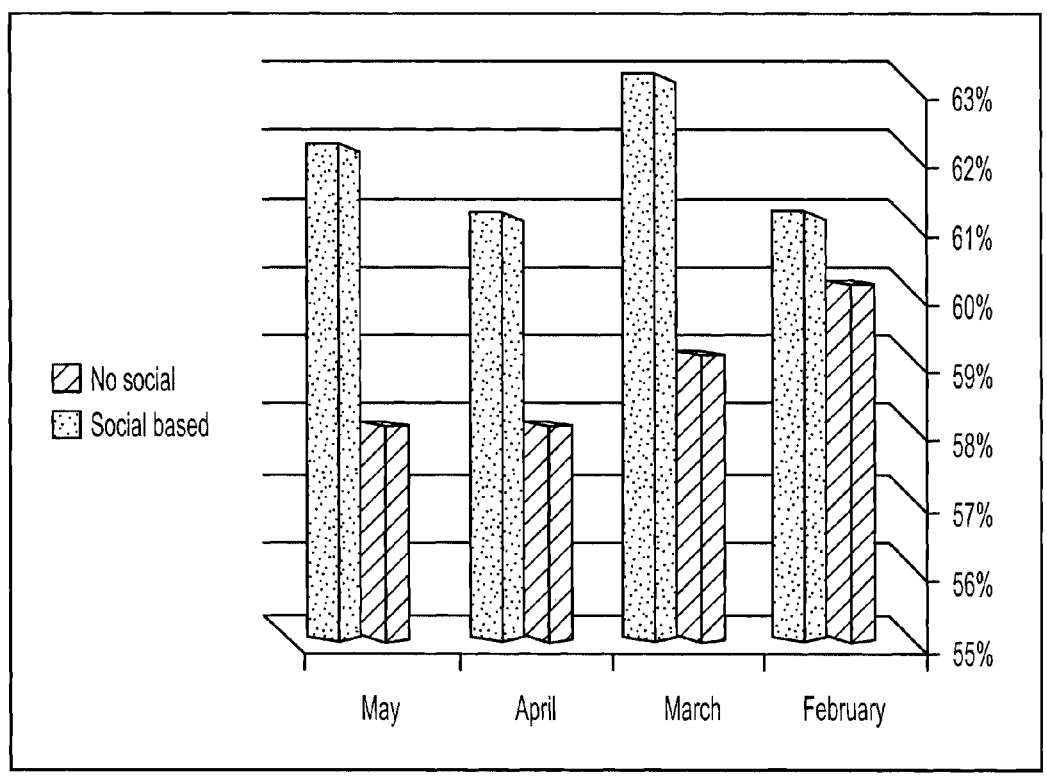
FIG. 3 is a visual depiction of the higher monthly Return on Investment (ROI) achieved using the invention, as compared to trading performed in other manners.

Referring now to FIG. 3, the monthly Return on Investment (ROI) is shown to be higher for traders using the semi-automatic social trading software of the invention, as compared with the ROI for other traders who do not use the invention. In the graph plotted, master traders were identified by the software of the invention, and users were asked whether to link their accounts to those of the identified master traders, thus social trading is termed "semi automatic". Before each trade was performed, users were informed of the intention to mimic the trading actions of the master user, and a mathematical calculation was automatically performed to estimate the prudence of the trade. Such a mathematical calculation is performed by a "profitability estimating module" of the system.

The user received an outputted estimation weighing the chance of success, which he could take into account before instructing the system whether to mimic the master trader's actions.

In all months shown, the ROI of traders who traded using this semi-automatic embodiment of the invention, was significantly higher than other traders who traded using other methods.

In fact, during the period of May 14, 2011-Jun. 14, 2011, this picture has become even clearer:
338,383 new positions.
10,789 positions were copied (3.19%).
Win Ratio:
    Normal: 60.82%
    Copied: 67.20%
Average Net Profit:
    Normal: −$6.26
    Copied: $0.23
Gurus (Master Traders): 95.

This shows that as the trading rules become more effective, they "describe" reality in a better way, immediately translated to higher returns.

Example 1

A-Trading Rule

Our method is based on calculating the cumulative alpha of each trader, based on which we construct a probabilistic algorithm for deciding which trader(s) to put which portion of our money on. The meta-learning algorithm which we want to apply is able to construct a compound algorithm from a pool of prediction algorithms. The prediction algorithms (corresponding to user decisions) are various types of learning algorithms or classifiers. Though there are many algorithms in the pool, there are sufficient reasons to believe that one or more will perform well.

For simplicity, assume that the setting is of binary decision problems. Namely, at each round one prediction bit is gotten from each user (BUY/SELL), and we need to output a single bit as well, based on the current predictions and past history of the users. To this end we construct the compound algorithm, which gives a positive weight to each of the algorithms in the pool. The compound algorithm then collects weighted predictions from all the algorithms in the pool, and gives the prediction that has a higher vote. If the compound algorithm makes a mistake (a "mistake" is defined as a sub-optimal prediction), the algorithms in the pool that contributed to the wrong predicting will be discounted by a certain ratio between 0 and 1.

It can then be shown that the upper bounds on the number of mistakes made in a given sequence of predictions from a pool of algorithms can roughly be bounded by:

$$n(\log(n)+m)$$

where "n" is the number of users and "m" is the number of mistakes made by the best algorithm in the pool.

There are many variations of the sketched algorithm to handle different (more general) situations, but the core mechanism remains similar, with the final performances of the compound algorithm bounded by a function of the performance of the specialist (best performing algorithm) in the pool. Tailoring the best compound algorithm will constitute the main bulk of the implementation.

The following Examples 2-3 describe well defined complex A-trading rules that are based on social trading information:

Example 2

A-trading Rule 2

Input—a graph G that represents the "linked" interactions between the various users (each directed edge represents a single connection).
Let "N" be the adjacency matrix that corresponds to the graph G.
Let "A" be the inverse of the largest value of the matrix N.
Let "p_spread" be the probability that if some user purchases a commodity X, its neighbors also purchase this same commodity (calculated from observations carried out on past data).
Let "T" be the expected time from purchase of a commodity until it is sold.
If (T*P_spread>A) then we can predict that a "trend" of purchases is expected. Hence, the software would automatically follow purchasing performed by master users having the top profitability ranking.

Example 3

A-trading Rule 3

Rank the users according to the number of their followers in the social trading network.
We allocate our investment money automatically pro-rata to the top 10 users ("top" means the users with the most followers).

Clearly, A-Trade rules in accordance with some embodiments of the present invention may include a combination of one or more conditions relating to other users trading activity and any other type of condition (such as a market history condition). For example, an A-Trade rule may comprise: "If the price of a specific financial asset drops more than 10% within a 3 day period and 20% or more of the traders on a LATS have purchased this specific asset within those 3 days, automatically purchase this asset using 20% of the remaining balance in the account."

Figure 4:
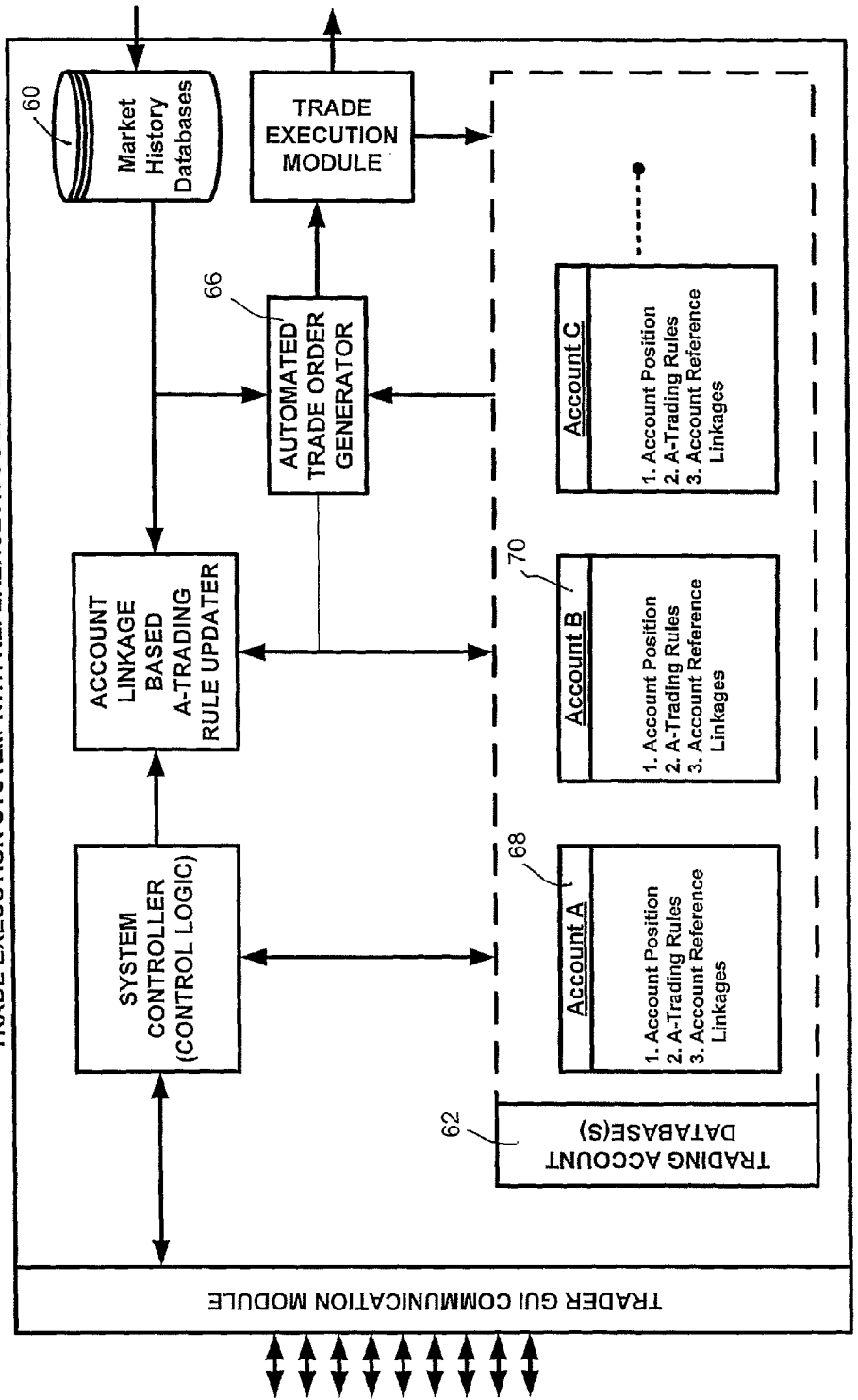
FIG. 4 is a functional block diagram of an exemplary trade execution system with Reference Account Linkage, in accordance with some embodiments of the present invention.

Referring now to FIG. 4, a functional block diagram is illustrated, of an exemplary trade execution system with Reference Account Linkage, in accordance with some embodiments of the present invention The LATS may include, or be functionally associated with, an Automated Trade Order Generator (an "A-Trade Generator") 66, adapted to generate trading orders for a given trading account based on one or more automated trading rules associated with the given trading account. The A-Trade Generator may monitor the Market History Databases 60 and the Accounts Databases 62 to identify the occurrence of any set of circumstances defined within one or more A-Trade Rules associated with one or more user accounts and generate the associated A-Trades upon the identification of the pre-defined circumstances.

According to further embodiments of the present invention, a LATS may further comprise a User Trade Analyzing Module adapted to monitor, record and analyze trade activity of users of the LATS and extract parameters relating to the trade activity of specific users of the LATS, specific groups of users of the LATS (selected and/or defined by criteria) and/or all the users of the LATS. The User Trade Analyzing Module may display recorded trade activity and the results of its analysis to a user and/or this data, in whole or in part, may serve an A-Trade Generator in its operation (i.e. a User Trade Analyzing Module may assist an A-Trade Generator in monitoring user trading accounts and user trading activity on the system). Examples of analysis a User Trade Analyzing Module may perform upon recorded trade activity of users may include identifying specific users or groups of users whose trading history answers certain criteria (e.g. users with an average return of 20% annum or higher), identifying trends in general user trade (e.g. 30% of traders have sold oil related financial assets today), extracting specific variables relating to LATS user trading (e.g. what percentage of LATS users currently hold oil related financial assets equaling at least 20% of their portfolio) and/or any other analysis of LATS user trading activity.

According to further embodiments of the present invention, a trading account on a LATS may be linked to one or more other trading accounts on a LATS. A Trading Account linked to another may further comprise specific A-Trading rules relating to the linked account. For example, trading account A 68 may be linked to trading account B 70, wherein, trading account A comprises an A-Trade rule: "if Trader B orders any trade, order the same trade for trading account A". Accordingly, a trading account on a LATS may include Reference Account Linkage Data comprising a listing of trading accounts to which the account is linked ("Reference Accounts") and one or more definitions of the nature of each linkage. It should be understood that, Reference Account Linkage Data may include listings of trading accounts to which the account is linked and listings of trading accounts linked to it.

According to yet further embodiments of the present invention, a given trading account on a LATS may further comprise A-Trade Rule Updating Rules associated with the given account, defining formulas for automatically updating A-Trade rules associated with the given account based on:
  a. market history and/or events. For example: "If the price of oil goes below $50 a barrel, enact A-Trade Rule: whenever trader X purchases oil related financial assets, purchase the equivalent amount for the given account.";
  b. trading activity on one or more reference accounts. For example: "If trader X goes below 20% average return per annum, cancel A-Trade Rule: whenever trader X purchases oil related financial assets, purchase the equivalent amount for the given account.";
  c. A-Trade rule changes on a reference account. For example: "If trader X changes any of his/her A-Trade rules, enact identical changes in A-Trade rules associated with the given account.";
  d. Any other relevant event; and/or
  e. Any combination thereof.

Figure 5:
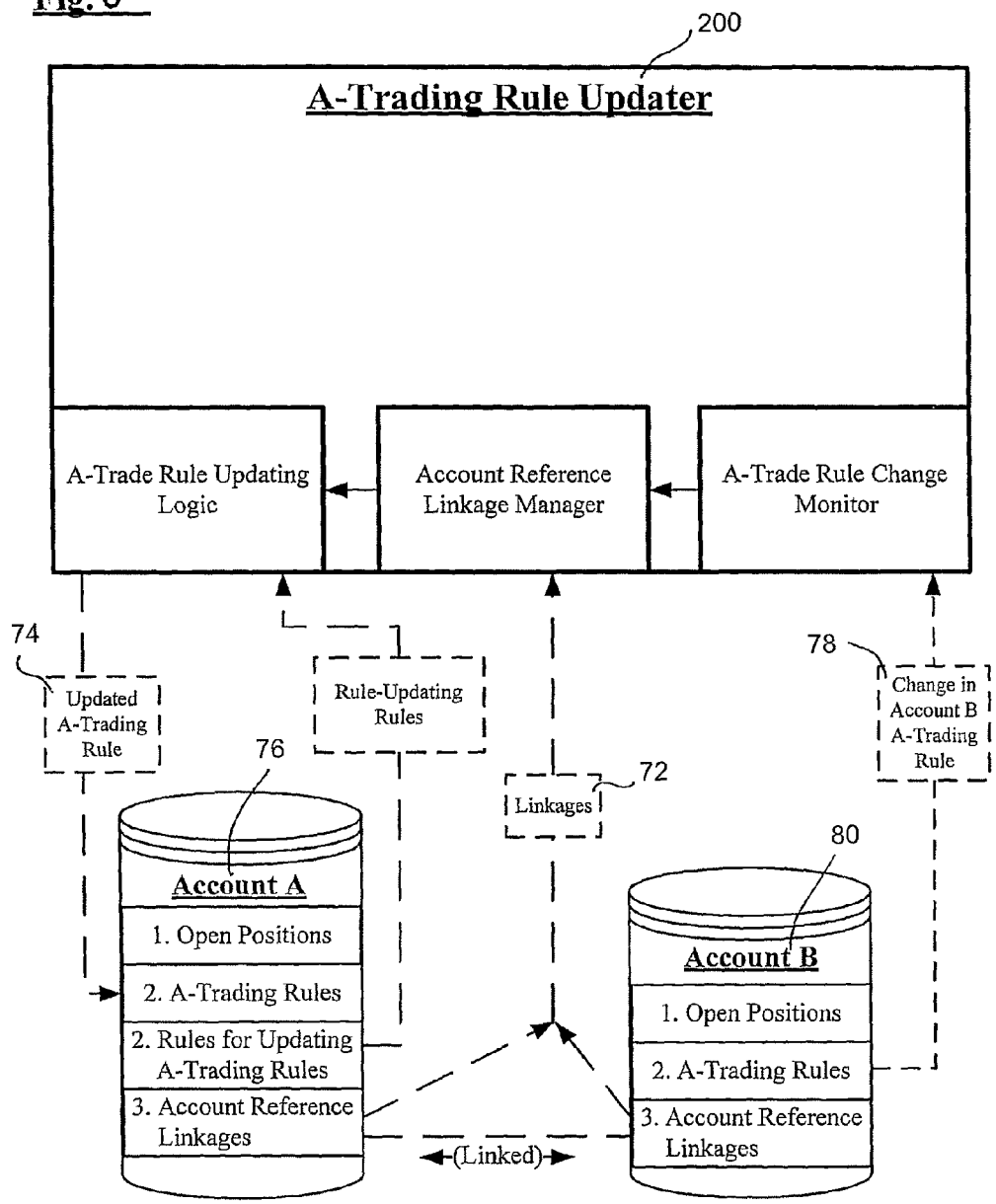
FIG. 5 is a functional block diagram of an exemplary A-Trading Rule Updater, in accordance with some embodiments of the present invention.

Referring to FIG. 5, according to even further embodiments, the LATS may include an Account Linkage Automatic Trading Rule Updater (UPDATER) 200 which is adapted to update the A-Trading rules associated with a given trading account based on: (1) the given account's defined linkages 72 with one or more reference accounts, (2) activity on the reference account, (3) defined market activities or events, and/or (4) any other related event.

According to some embodiments of the present invention, Reference Account Linkage Data between a given account and a Reference Account may be defined as one or more relationships between trading related activity occurring on the Reference Account and one or more A-Trading Rules on the given account. Account linkage parameters may include values or other digital forms of identifiers for: (1) identification of Reference Account(s) to link the given account with; (2) correlating specific trading related activities on the linked reference account with specific A-Trading Rules on the given trading account; (3) to what extent, and/or how, to change an A-Trading Rule of the given trading account based on correlated trading related activities on the Reference Account; and (4) any other trading related (optionally: complex) conditions and/or market related (optionally: complex) condition(s) to factor when changing an A-Trading Rule of the trading account.

Accordingly, a Linked Account Automated Trading Rule Updater (UPDATER) 200 may be adapted to update one or more automatic trading rules 74 (i.e. a first set of A-Trading Rules) of the given trading account in response to trading related activity within a first Reference Account, Account A 76, to which the given account is linked. The UPDATER may be further adapted to update other automatic trading rules 78 (i.e. a second set of A-Trading Rules, which second set may or may not overlap with the first set) of the given trading account in response to trading related activity within a second reference account, Account B 80, to which the given account is linked. Likewise, an UPDATER 200 may be adapted to update automatic trading rules of each of two or more trading accounts based on trading related activity within one or more reference accounts to which each of the two or more trading accounts is linked.

According to some embodiments, there may be provided an account management application adapted to interface with a user of the LATS (a trader), possibly via a Trading System Interface Application, and facilitate user modification of trading account parameters. An Account Management Application may be adapted to allow a user to create, update, modify, cancel or otherwise change any account parameter, including A-Trade definitions and/or linkage parameters associated with a trading account. Account linkage parameters which may be updated may include: (1) identification or definition of Trading Account(s) to link with; (2) correlation of specific trading related activities on linked accounts with specific A-Trading Rules on the trading account; (3) to what extent, and/or how, to change an A-Trading Rule of the trading account based on correlated trading related activities of a Reference Account; and (4) any other trading related and/or market activity related condition(s) to factor when changing an A-Trading Rule.

According to some embodiments, there may be provided a system or an environment or a mechanism for representing A-Trading rules in a variety of ways. Specifically, there may be provided a system or an environment or a mechanism for visually representing A-Trading Rules using a set of objects and operators that indicate the interactions between them, according to some pre-defined representation language.

According to some embodiments, there may be provided an open system or an environment or a mechanism for allowing users of the LATS to view, update, generate, activate, modify or interact in any other way with A-Trading Rules that are associated with their account.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood by one of skill in the art that some of the functions described as being performed by a specific component of the system may be performed by a different component, or combination of components, of the system in other embodiments of this invention.

The present invention can be practiced by employing conventional tools, methodologies and components. Accordingly, the details of such tools, components and methodologies are not set forth herein in detail. In the previous descriptions, numerous specific details are set forth, in order to provide a thorough understanding of the present invention. However, it should be recognized that the present invention might be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

The invention claimed is:

1. A computerized social trading system comprising:
   an electronic trading module adapted to execute trades of financial assets;
   a user-account database adapted to contain details associated with a first user trading account and a second user trading account, the details associated with said first user trading account including at least one automatic trading rule; and
   an automatic electronic trade generator functionally associated with said electronic trading module and configured to automatically generate a first user trade order for said first user trading account based on said at least one automatic trading rule;
   wherein, said at least one automatic trading rule includes a condition that is met by a first trading activity in the second user trading account and not met by a second trading activity in the second user trading account; and
   wherein said first and second user trading accounts are associated with different users of the system.

2. The system according to claim 1, wherein the system includes a profitability estimating module, for mathematically determining whether a trade performed by a first user trading account is likely to generate a profit; said profitability estimating module outputting a profitability estimation.

3. The system according to claim 1, wherein said details associated with said first user trading account include a second automatic trading rule, which second automatic trading rule includes a second condition dependent on a third trading activity of two or more other users of the system, and wherein the automatic electronic trade generator is further configured to automatically generate a second user trade order for said first user trading account based on said second automatic trading rule.

4. The system according to claim 1, wherein said at least one automatic trading rule further includes a condition dependent on the trading history of said second user trading account.

5. The system according to claim 1, wherein said at least one trading rule further includes a condition dependent on the trading activity of all users of the system.

6. The system according to claim 1, wherein said automatic electronic trade generator is further adapted to generate, for said at least said first user trading account, trade orders identical to every trade order executed by the system for said second user trading account.

7. The system according to claim 1, further comprising an electronic module for ranking profitability of traders and for identifying a master trader.

8. The system according to claim 1, wherein said automatic electronic trade generator is semi-automatic, wherein a user is queried prior to performance of a trading activity.

9. The computerized social trading system according to claim 1 wherein the first trading activity relates to a given financial asset selected from a plurality of financial assets.

10. The computerized social trading system according to claim 9 wherein the second trading activity relates to another financial asset different than the given financial asset.

11. The computerized social trading system according to claim 9 wherein said at least one automatic trading rule includes a second condition related to a market event related to the given financial asset.

12. The computerized social trading system according to claim 1 wherein the condition also relates to a third trading activity of a third user.

13. The computerized social trading system according to claim 1 wherein the condition also relates to a prediction of a trend of purchases of a given commodity.

14. The computerized social trading system according to claim 1 wherein the at least one automatic trading rule can be updated in accordance with a trading rule updating rule.

15. The computerized social trading system according to claim 14 wherein the trading rule updating rule includes a condition dependent on a market event or on a given trading activity of the second user.

16. A method for facilitating social trading on a computer comprising:
   automatically executing on a CPU a trade for a at least a first trader based on an automatic trading rule stored in a database, wherein said automatic trading rule includes a condition that is met by a first trading activity of a second trader and not met by a second trading activity of the second trader.

17. The method according to claim 16, wherein said automatic trading rule further includes a condition dependent on the trading activity of more than ten traders, which traders are trading on the same trading system as said first trader.

18. The method according to claim 16, wherein said automatic trading rule further includes a condition dependent on the trading history of said second trader.

19. The method according to claim 16, wherein said automatic trading rule further includes a condition dependent on the trading activity of all traders trading on the same trading system as said first trader.

20. The method according to claim 16, further comprising the step of automatically ranking on the CPU the profitability of traders and identifying a master trader.

21. The method according to claim 16, wherein said automatic execution of said trade on the CPU is executed in a semi-automatic manner such that a user is queried prior to performance of a trade.

22. The method according to claim 16, wherein said method includes calculating on the CPU a profitability estimation, for mathematically determining whether a trade performed by a first trading account is likely to generate profit;
said profitability estimation outputting a profitability estimation value prior to automatic execution of the CPU of said trade.

23. The method of claim 16 wherein the first trading activity relates to a given financial asset selected from a plurality of financial assets.

24. The method of claim 23 wherein the second trading activity relates to another financial asset different than the given financial asset.

25. The method of claim 23 wherein automatic trading rule includes a second condition related to a market event related to the given financial asset.

26. The method of claim 16 wherein the condition also relates to a third trading activity of a third user.

27. The method of claim 16 wherein the condition also relates to a prediction of a trend of purchases of a given commodity.

28. The method of claim 16 wherein the automatic trading rule can be updated in accordance with a trading rule updating rule.

29. The method of claim 28 wherein the trading rule updating rule includes a condition dependent on a market event or on a given trading activity of the second user.

30. The method according to claim 16, wherein said automatically executing is based also on a second automatic trading rule, which second automatic trading rule includes a second condition dependent on the trading activity of two or more other users of the system.

* * * * *